United States Patent
Marsetti et al.

(10) Patent No.: US 6,598,729 B2
(45) Date of Patent: Jul. 29, 2003

(54) WALL ELEMENT INCORPORATING IDLE ROLLERS

(75) Inventors: Sergio Marsetti, Castelli Calepio (IT); Rodolfo Reatti, Brivio (IT)

(73) Assignee: System Plast S.p.A., Telgate (IT)

( * ) Notice: Subject to any disclaimer, the term of this patent is extended or adjusted under 35 U.S.C. 154(b) by 4 days.

(21) Appl. No.: 09/925,771

(22) Filed: Aug. 9, 2001

(65) Prior Publication Data

US 2002/0017067 A1 Feb. 14, 2002

(30) Foreign Application Priority Data

Aug. 9, 2000 (IT) ........................................ MI2000476 U

(51) Int. Cl.$^7$ .............................................. B65G 47/12
(52) U.S. Cl. ........................ 198/452; 193/37; 193/35 R; 198/836.1
(58) Field of Search .................. 198/452, 453, 198/836.1, 636, 637, 599, 454; 193/35 R, 35 C, 37

(56) References Cited

U.S. PATENT DOCUMENTS

| 3,586,142 A | * | 6/1971 | Inwood et al. ............. 193/35 R |
| 3,934,706 A | * | 1/1976 | Tice ............................ 198/454 |
| 5,911,306 A | * | 6/1999 | Ferrari ..................... 198/836.1 |
| 6,076,655 A | * | 6/2000 | Marsetti ..................... 198/445 |
| 6,079,544 A | * | 6/2000 | Donati et al. ............... 198/446 |
| 6,196,375 B1 | * | 3/2001 | Cozza ..................... 198/836.1 |

* cited by examiner

Primary Examiner—Christopher P. Ellis
Assistant Examiner—Richard Ridley
(74) Attorney, Agent, or Firm—Steinberg & Raskin, P.C.

(57) ABSTRACT

A wall element incorporating idle rollers, presenting a body with seats into which stationary pins carrying idle rollers are snap-fitted; said body presents two parts (22, 30), of which one is the lower base part (22) and the other the upper base part (30), these being structurally separate, but connected together by just the pins (10, 21), which present end portions (15, 15A) transversely wider than adjacent portions (11a, 21a) provided for their snap-fitting into seats (12a,b,c; 22a,b,c) in said two parts (22, 30), said wider portions (15, 15A) abutting against said seats to prevent any movement of said parts (22, 30) in the axial direction of the pins (10, 21).

6 Claims, 2 Drawing Sheets

WALL ELEMENT INCORPORATING IDLE ROLLERS

FIELD OF THE INVENTION

The present invention relates to a wall element (central or lateral) presenting a body to which stationary pins carrying idly mounted rollers are snap-connected. The element, together with other equal or similar elements, is intended to form central or lateral walls bounding conveying paths for products in general, for example containers (such as bottles, cans, etc.), or their accumulation stations. In the case of central walls, the element presents two parallel rows of idle rollers; in the case of lateral walls, the element presents only one row of idle rollers.

BACKGROUND OF THE INVENTION

The load-bearing structural part of the known elements is formed from a single moulded piece of plastic material either strong in itself or strengthened by suitable fillers. This structural part comprises an upper and lower base elements and a core which connects them together. In the case of elements for central walls, the cross-section of the load-bearing structural part has an I-shaped configuration, whereas for lateral walls the configuration is C-shaped.

For snap-fitting the roller pins, the lower and upper base elements are provided laterally with seats, of number equal to the number of pins, into which these latter are snap-fitted. The accompanying FIG. 1, relative to a known solution, shows on an enlarged scale a detailed perspective view of a seat and the end of the relative pin. The roller pin 1 is cylindrical, with its end 1a also cylindrical, but of lesser diameter. The load-bearing structural part is in this figure represented by its lower base element 2 (of which only the part concerned is shown), where it presents a tapered lateral lead-in 2a opening into a circular seat of diameter equal to or slightly less than that of the end 1a of the pin. The narrowest (blocking) part 2c of the lead-in 2a is narrower than that of the end of the pin 1, so that the pin can be snap-inserted into the seat 2b with a certain force, by utilizing the elastic deformability of the materials. The pins with the relative rollers are hence adequately retained in the load-bearing structural part of the element.

OBJECTS AND SUMMARY OF THE INVENTION

The known solution can however be improved in the sense of reducing the overall size, the weight and the constructional complexity of the structural part of the element, by eliminating the core joining the lower and upper base elements of the wall element, and using the pins themselves to join the upper and lower base elements so that these become independent parts, i.e. not forming an integral piece.

BRIEF DESCRIPTION OF THE DRAWINGS

The invention will be more apparent from the ensuing detailed description given by way of non-limiting example, with reference to the accompanying drawing, in which.

DETAILED DESCRIPTION OF THE INVENTION

Figure 1:
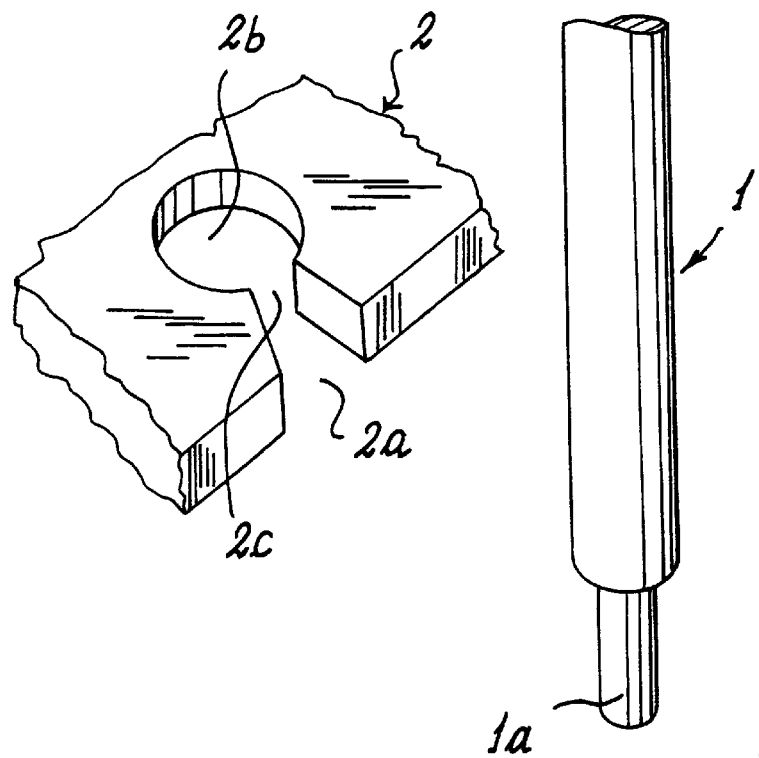
FIG. 1 is a partial exploded perspective view of that provided by the state of the art.
Figure 2:
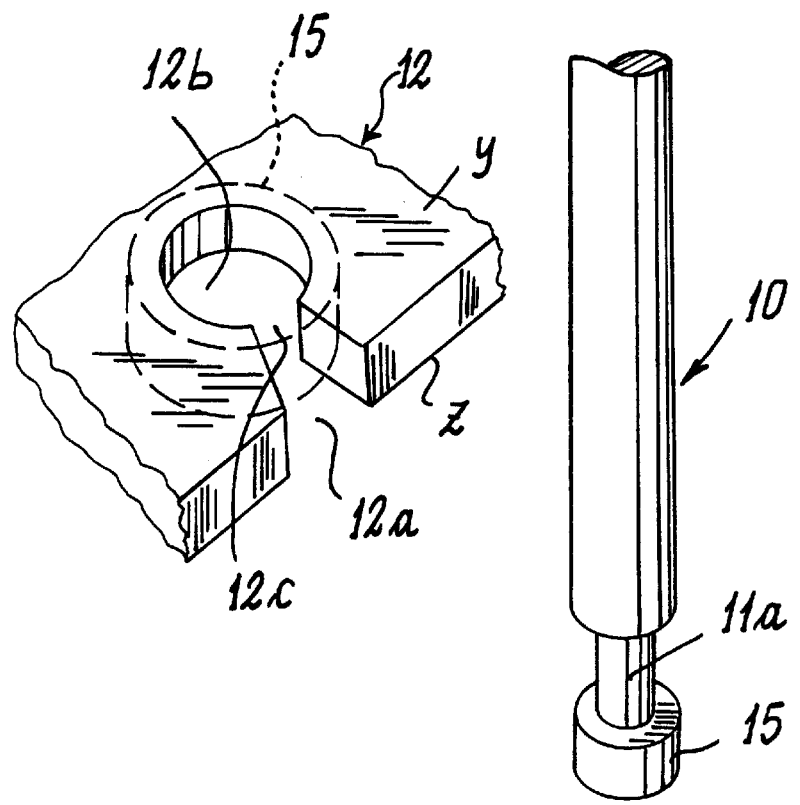
FIG. 2 is a similar partial exploded perspective view of the basic solution used by the invention.

FIG. 2, in which equal or corresponding parts are indicated by the same reference numeral used in FIG. 1 plus 10, shows the essence of the invention. To enable the roller pins 10 to replace the core joining the upper and lower base elements of the traditional wall element, the pins are made to present at their opposite ends the form shown basically in FIG. 2, in which the part 11a of reduced diameter is followed by a head 15 which can have the same diameter as the intermediate part of the pin, but must exceed the diameter of the seat 12b which snap-receives the smaller-diameter part 11a of the pin. As indicated by the dashed line, when the pin is mounted, the head 15 lies on that side Z of the lower base element 12 (and of the upper base element by analogy) opposite the side Y facing the intermediate part of the pin. The heads 15 prevent separation of the upper and lower base elements of the wall element, so replacing the function of the connecting core.

Figure 3:
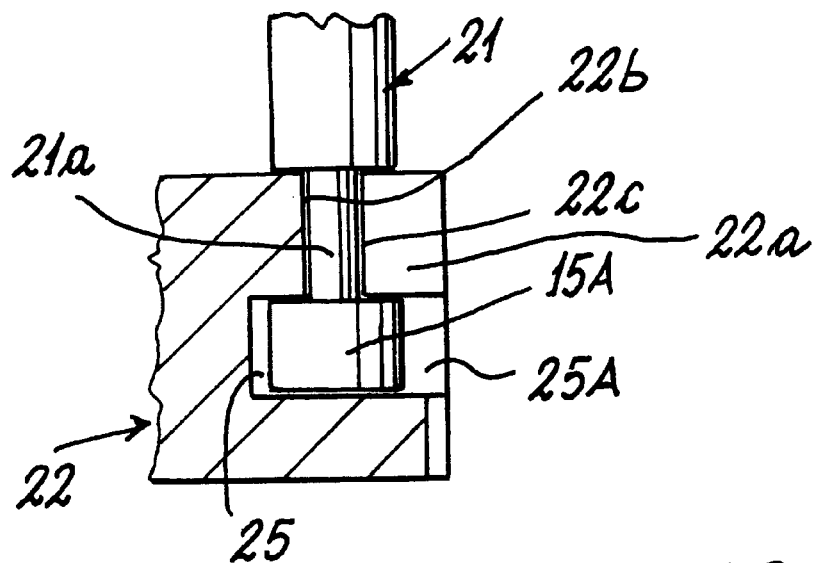
FIG. 3 is a detailed cross-section through a variant.

FIG. 3 shows a variant in which the head 15A is received in a seat consisting of a semicylindrical base groove 25 of diameter equal to or greater than the head, here indicated by 15A, and with an access 25A having parallel sides spaced apart by said diameter. In this figure, the pin is indicated by 21, the head by 15A, the pin part of reduced cross-section by 21a, the seat (which receives the reduced cross-section part 21a) by 22b, the tapered lead-in by 22a, and the lower base element by 22.

Figure 4:
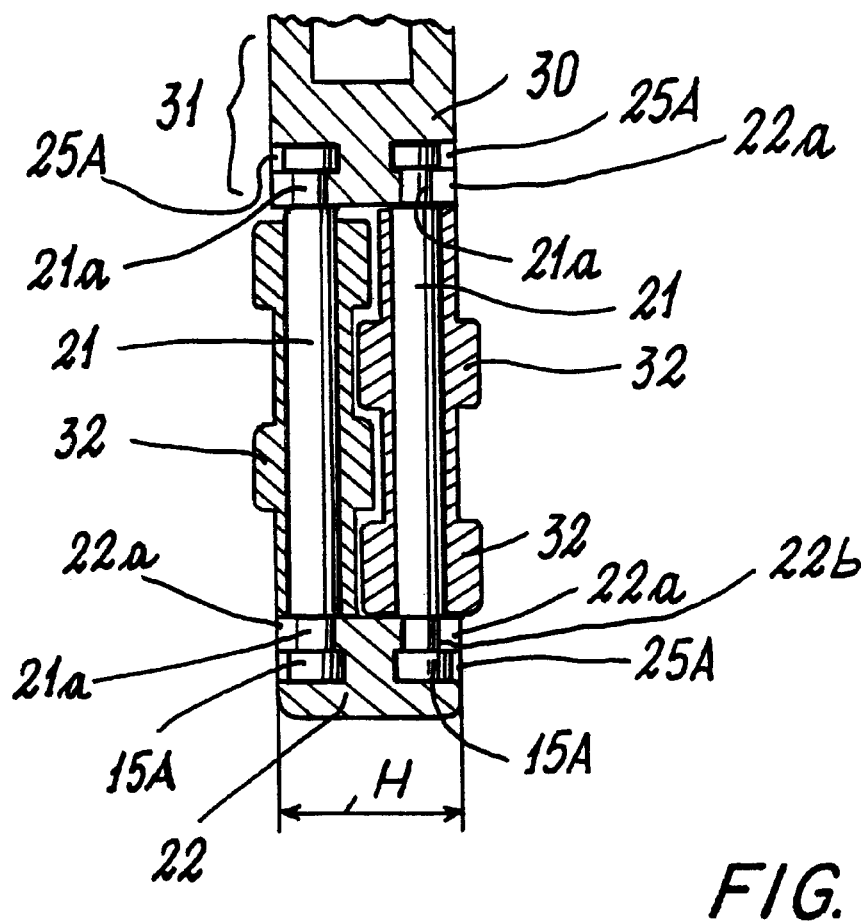
FIG. 4 is a cross-section through the wall element of the invention incorporating that shown in FIG. 3.

FIG. 4 shows a partial section through a wall element, indicated overall by 31. This element uses the solution of FIG. 3 for snap-fitting the roller pins, hence FIG. 4 uses the same reference numerals to indicate equal or corresponding parts.

The pins 21 are snap-fitted at their opposing ends to the lower 22 and upper 30 base elements as shown in FIG. 3. The idle rollers on the pins 21 are indicated by 32.

As is apparent from FIG. 4, the connection between the lower and upper base elements (which are two separate pieces) is entrusted entirely to the pins 21 carrying the rollers 32. Hence the wall element of the invention dispenses with that connection core (between the lower and upper base elements) present in traditional wall elements. This absence enables wall elements to be formed having a substantially smaller overall transverse dimension H (FIG. 4).

We claim:

1. A wall element incorporating idle rollers comprising: a body with seats into which stationary pins carrying idle rollers are snap-fitted, said body having two parts (22, 30), of which one is a lower base part and the other an upper base part, these being structurally separate, but connected together by just the pins (10, 21), which present end portions (15, 15A) transversely wider than adjacent portions (11a, 21a) provided for their snap-fitting into seats (12a,b,c; 22a,b,c) in said two parts (22, 30), said wider portions (15, 15A) abutting against said seats to prevent any movement of said parts (22, 30) in the axial direction of the pins (10, 21).

2. An element as claimed in claim 1, wherein housings (25, 25A) for the end portions (15A) are provided in the two parts (22, 30), external to the seats (22a,b,c).

3. An element as claimed in claim 1, further comprising a central wall element, provided with two adjacent rows of idle rollers (32) (FIG. 4).

4. A wall element incorporating idle rollers, comprising: a body including a lower base part defining a lower slot and an upper base part defining an upper slot;

a plurality of pins disposed between said lower base part and said upper base part, each of said plurality of pins includes a first end portion, second end portion, a first narrow portion, a second narrow portion and a center portion wherein said first and second end portions have a diameter greater than said narrow portion and wherein said center portion has a diameter greater than said narrow portion; and wherein said lower slot receives said first narrow portion and said upper slot receives said upper narrow portion, said first end portion being in abutment with said lower base portion and said second end portion being in abutment with said upper base portion whereby each of said end portions of said plurality of pins prevents movement of said lower base part and said upper base part in the axial direction of said plurality of pins.

5. An element as claimed in claim 4, wherein the lower base portion includes a lower housing to receive said first end portion of said plurality of pins and the upper base portion includes an upper housing to receive the second end portion of said plurality of pins.

6. An element as claimed in claim 4, further comprising a central wall element, said central wall element includes a plurality of rows, each of said plurality of rows having idle rollers.

* * * * *